United States Patent [19]

Takahashi

[11] Patent Number: 4,803,681
[45] Date of Patent: Feb. 7, 1989

[54] DATA TRANSMISSION CONTROL SYSTEM

[75] Inventor: Kiyoh Takahashi, Tokyo, Japan

[73] Assignee: NEC Corporation, Japan

[21] Appl. No.: 70,036

[22] Filed: Jul. 6, 1987

[30] Foreign Application Priority Data

Jul. 8, 1986 [JP] Japan .................................. 61-161120

[51] Int. Cl.⁴ ................................................. H04J 3/26
[52] U.S. Cl. ..................................... 370/85; 340/825.5
[58] Field of Search ...................... 370/85, 94, 60, 89; 340/825.5, 825.51

[56] References Cited

U.S. PATENT DOCUMENTS

| | | | |
|---|---|---|---|
| 4,236,245 | 11/1980 | Freeny et al. | 370/89 |
| 4,656,627 | 4/1987 | Hasley et al. | 370/85 |
| 4,701,911 | 10/1987 | Ulug | 370/94 |
| 4,707,828 | 11/1987 | Yamada | 370/85 |
| 4,730,250 | 3/1988 | Girard et al. | 370/85 |

OTHER PUBLICATIONS

Mutliaccess Protocols in Packet Communication Systems Fouad A. Tobagi, IEEE Transactions on Communications, vol. COM-28 No. 4, Apr. 1980.

Primary Examiner—Douglas W. Olms
Attorney, Agent, or Firm—Laff, Whitesel, Conte & Saret

[57] ABSTRACT

A control system attends to an orderly transmission of data over a time division multiplex data bus. Each time that a terminal wants to transmit data over the data bus, it files a request for data transmission with an arbiter circuit, which normally grants the requests on a first come, first serve basis. If there are simultaneous requests, the arbiter consults a table of priorities stored in its memory. The one of the simultaneous requests with the highest priority is served first.

Each terminal acknowledges the data which it receives. If the acknowledgment does not come back in a timely manner, the data is retransmitted.

7 Claims, 12 Drawing Sheets

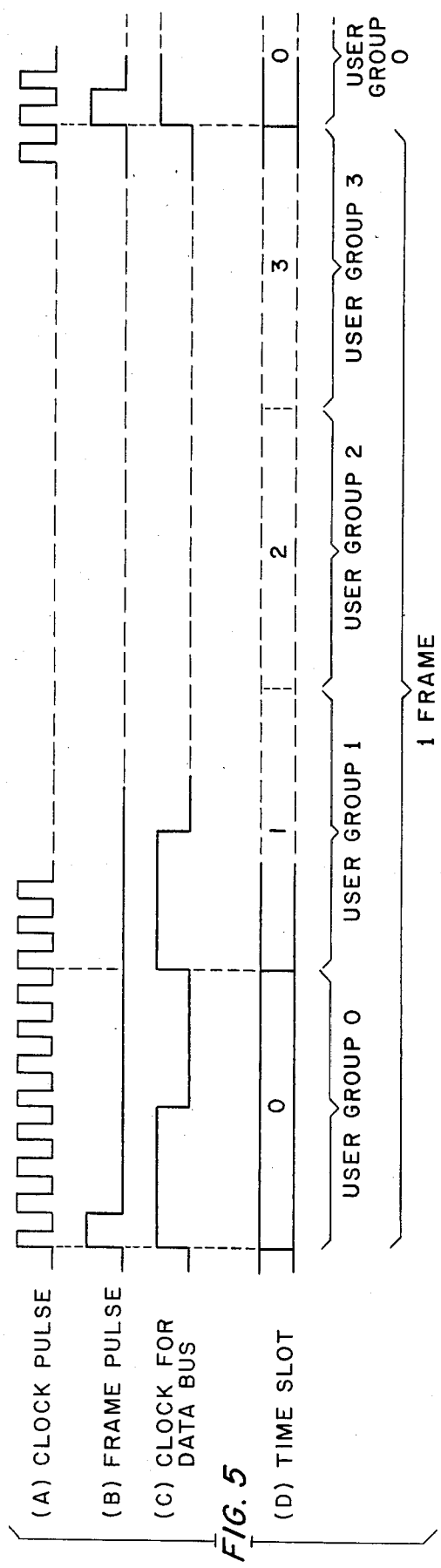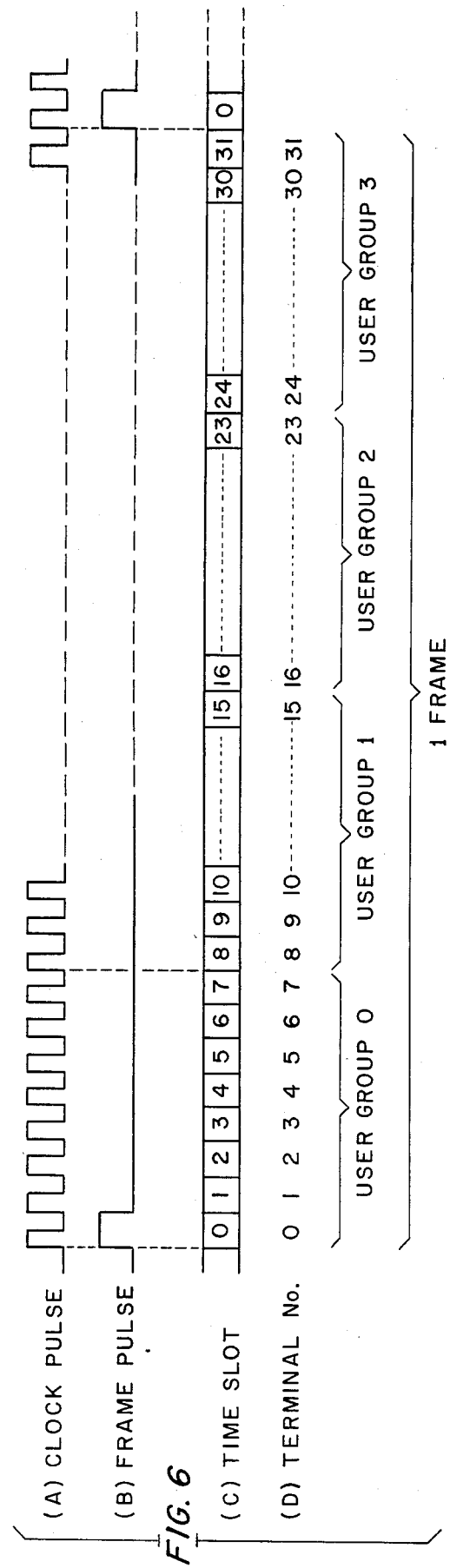
FIG. 5
FIG. 6

DTR = DATA TRANSMISSION RIGHT

FIG. 9  DTR=DATA TRANSMISSION RIGHT

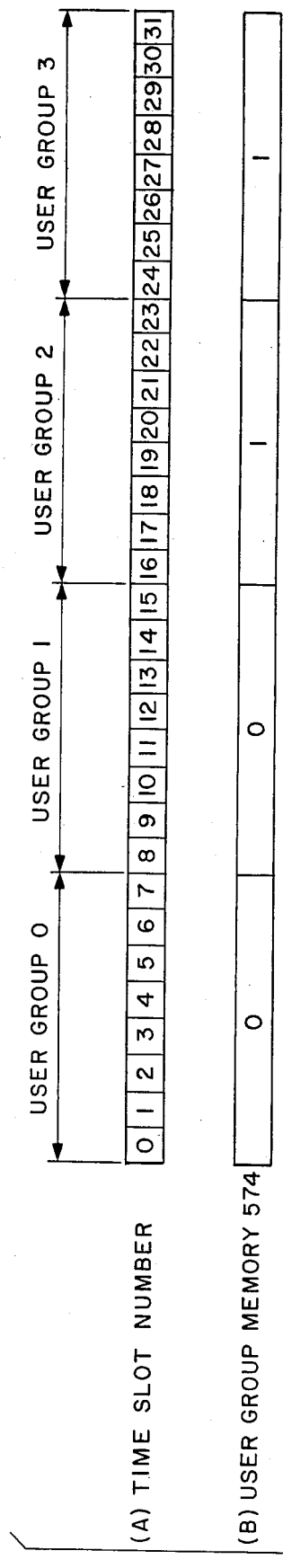

DATA TRANSMISSION CONTROL SYSTEM

BACKGROUND OF THE INVENTION

1. Field of the Invention

The present invention relates to a data transmission control system for allowing data to be transmitted between a plurality of communication terminals.

2. Description of the Prior Art

A recent achievement in the communications art is a local area network (LAN) in which a plurality of computers may be connected to a network to share a file, a printer and other peripherals in order to scatter the loads of data processing. In this kind of a system, where the data is to be transmitted occur in bursts, there is extensively used a random access control technique which does not set up particular links between individual terminals. Instead, any of the terminals may have random access to a common bus to transmit data (packets) as desired.

For details of the random access control technique, a reference may be made to an article "Multiaccess Protocols in Packet Communication Systems" presented by FOUAD A. TOBAGI in IEEE TRANSACTIONS ON COMMUNICATIONS, VOl. COM-28, NO. 4, April issue, 1980. The Carrier Sense Multiple Access (CSMA) system as disclosed in the above article is such that just before beginning to send a packet, a terminal determines whether or not a data bus is occupied (carrier sense). If it is not occupied, the terminal sends a packet, thereby reducing collisions of packets on the data bus which would destroy data.

The carrier sense alone, however, cannot fully eliminate the collision of packets because a plurality of terminals may start sending packets at substantially the same time. In the light of this, a use is made of a system in which a receive side terminal receives a normal packet and returns an acknowledge (ACK) packet to a transmit side terminal for confirmation purpose. Then, the transmit side terminal retransmits the same packet when it fails to receive the ACK packet from the receive side terminal.

A reference will be made to FIGS. 1 and 2 for describing details and problems of the CSMA/ACK system.

As shown, each of a plurality of terminals 2a to 2n of the CSMA/ACK system is made up of a receiver 21 connected to a data bus 6 for receiving packets data, a carrier sensor 211 for sensing a packet which may be transmitted over the bus 6, a receive packet buffer 22 for temporarily storing a received packet, a packet detector 26 for detecting the kind of a packet that is received, an ACK packet detector circuit 23 which produces an output when the receive packet is an ACK packet, a timer 25, a time-out judging circuit 24, a transmit packet buffer 29 for temporarily storing a transmit packet, a driver 27 connected to the data bus 6 for transmitting a packet, a transmission controller 28 for controlling packet transmission, and a controller 20 for controlling the general operations which a terminal needs to perform.

When data which is to be transmitted occurs at the transmit side terminal 2a, the controller 20 prepares a transmit packet by adding a header, an address, a parity, and other informations to the data (step 2001). Then controller 20 writes it into the buffer 29 while notifying the transmission controller 28 of the generation of the transmit packet. If no packet is present on the bus 6, as sensed by the carrier sensor 211 (step 2002), the controller 20 informs the transmission controller 28 of such an idle state of the bus 6. The packet stored in the buffer 29 is sent to the bus 6 via the driver 27 (step 2003). At the same time, the transmission controller 28 resets the timer 25 to cause it to start counting time.

On the other hand, at the receive side terminal 2b, the packet which is received is fed to the buffer 22 via the receiver 21. When the packet detector 26 recognizes that a normal packet meant for its own terminal has been received, the controller 20 reads the packet out of the buffer 22 and prepares an ACK packet which is then returned via the buffer 29 and driver 27.

When the ACK packet is received by the transmit side terminal 2a, the ACK packet detector 23 detects it and produces a signal. The time-over judging circuit 24 monitors the output of the timer 25 and the output of the detector 23 to see if the ACK packet has been received within a predetermined period of time (step 2004). If the predetermined period of time has expired before the receipt of the ACK packet, the judging circuit 24 produces an output signal. On the other hand, if the ACK packet has been received within the predetermined period of time, the controller 20 receives the output signal of the detector 23 via a gate 201. In turn, controller 20 causes the transmission controller 28 to erase the packet in the buffer 29, thereby ending the transmission procedure (step 2005). If the ACK packet has not been received within the predetermined period of time, the transmission controller 28 responds to the output of the judging circuit 24 (i.e. packet retransmit request) by entering into a packet retransmission procedure to return to the step 2002.

As described above, in the prior art system, both the transmit and receive paths of the individual terminals are directly connected to the data bus. This brings about a problem. When packets are transmitted at the same time and are destroyed to make their destination addresses unidentifiable or when packets are determined to be faulty by the examination of data in the packets, all of the terminals 2 which are started to transmit packets simultaneously and which fail to receive ACK packets simply repeat the packet retransmission procedure individually. Another problem is that once such a conflict of packets occurs, the data bus is occupied wastefully from the instant of packet transmission to the instant of ACK packet receipt, i.e., throughout the previously mentioned predetermined period of time. Due to such problems, the throughput of the system becomes extremely low as the communication frequency of the terminals is increased.

Further, U.S. Pat. No. 4,063,220 discloses a CSMA/CD (collision detection) system in which a terminal transmits a packet while receiving a packet at the same time. By comparing the contents transmitted and received every moment, the terminal rapidly detects the occurrence of a packet collision. When a collision is detected, the terminal interrupts the transmission. The CSMA/CD system also suffers from the drawback that each of the terminals which transmitted at the same time have to execute a retransmission procedure after a random period of time. Also, a data bus is wastefully occupied during the interval between the transmission and the detection of a collision. An increase in the communication frequency of the terminals directly translates into a decrease in the throughput.

SUMMARY OF THE INVENTION

It is therefore an object of the present invention to eliminate the drawbacks particular to the prior art systems as discussed above and to provide a data transmission control system which insures a high throughput, even if the communication frequency is high.

It is another object of the present invention to provide a data transmission control system which implements an efficient bus system without resorting to modifications of the terminals of the prior art CSMA/ACK system, simply by connecting an extra device.

In order to achieve the above objects, a data transmission control system of the present invention comprises a plurality of terminals, each having a data transmit path connected to a data bus. Data is transmitted to the data transmit path after confirming that transmit data is absent on the data bus. When there is a failure to receive from an addressee on acknowledge information which is indicative of the receipt of the transmit data within a predetermined period of time, there is a retransmission of the transmit data after confirming that transmit data is again absent on the data bus.

A plurality of data transmission control means are disposed between respective ones of the data transmit paths of the terminals and the data bus. Upon a receipt of the transmit data from the terminal temporarily storing the transmit data and upon making a request for a data transmission right to the data bus. Only when the gained data transmission right, is granted is the transmit data transmitted from the terminal to the data bus.

Upon the receipt of the requests for a data transmission right from the data transmission control means, an arbiter means grants the data transmission control means permission to transmit the data transmission right to the data bus means according to a predetermined priority order.

BRIEF DESCRIPTION OF THE DRAWINGS

The above objects, features and advantages of the present invention will become more apparent from the following description taken with the accompanying drawings in which:

FIG. 5 is a chart which is representative of a frame format on a data bus 6 as shown in FIG. 3;

FIG. 6 is a chart which is representative of a frame format on arbiter buses 51 and 52 as also shown in FIG. 3;

FIG. 13 is a chart showing a specific example of data transmission right grant processing which is performed in FIG. 12.

It is to be noted that the same or similar structural parts and elements are designated by like reference numerals throughout the drawings.

DESCRIPTION OF THE PREFERRED EMBODIMENTS

Figure 3:
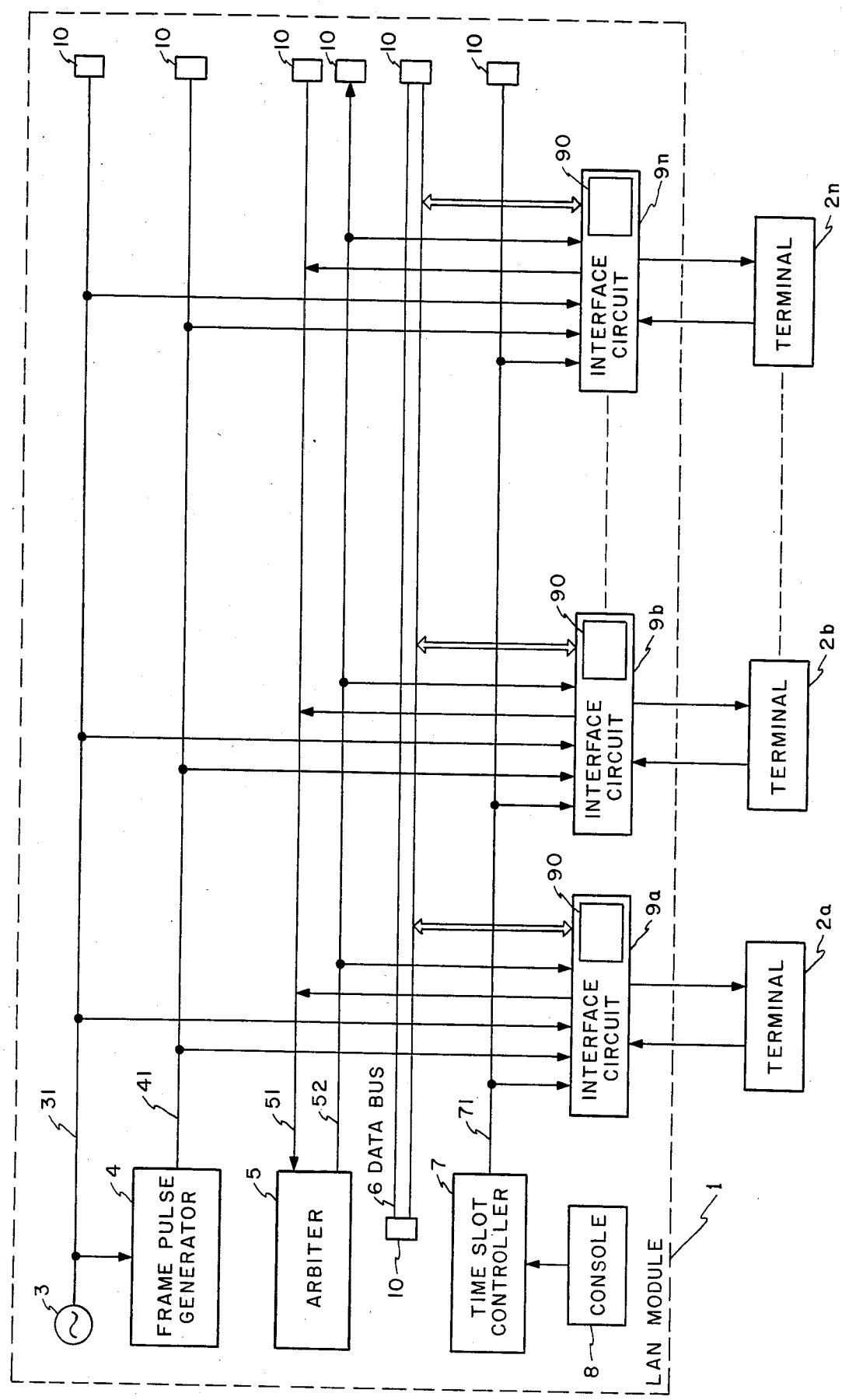
FIG. 3 is a block diagram showing an embodiment of the present invention.

Referring to FIG. 3, a data transmission control system in accordance with the present invention is made up of a LAN module 1 and a plurality of terminals 2a to 2n.

The LAN module 1 comprises a time-division multiplex data bus 6, a plurality of interface circuits 9a to 9n which are respectively connected between, the bus 6 and the terminals 2a to 2n. A clock pulse generator 3 applies clock pulses to the interface circuits 9a to 9n via a clock pulse supply line 31. A frame pulse generator 4 produces, based on the clock pulses, a frame pulse which is indicative of the head of a transmission frame on the bus 6. The frame pulse is delivered to the interface circuits 9a to 9n via a frame pulse supply line 41. An arbiter circuit 5 is connected to the interface circuits 9a to 9n via arbiter buses 51 and 52. A time slot controller 7 feeds time slot information, which is entered on a console 8, to the interface circuits 9a to 9n via a time slot control bus 71. One end of each of the buses 31, 41, 51, 52 and 71 and both ends of the data bus 6 are individually terminated at terminators 10 so as to prevent reflection of signals from occurring.

Receiving the frame pulses 41, the interface circuits 9a to 9n individually function to access by identifying particular channels, or time slots, which are assigned to their associated terminals 2a to 2n. At the time of receipt, the interface circuits 9a to 9n simply extract the time slots to deliver data to the individual terminals 2a to 2n. Stated another way, in so far as the direction of the receipt of data from the bus 6 is concerned, the terminals 2a to 2n may be considered as being connected directly and physically to the bus 6.

In each of the interface circuits 9a to 9n, a data transmission controller 90 is provided and connected between a transmit path extending from the interface circuit and the bus 6.

Figure 1:
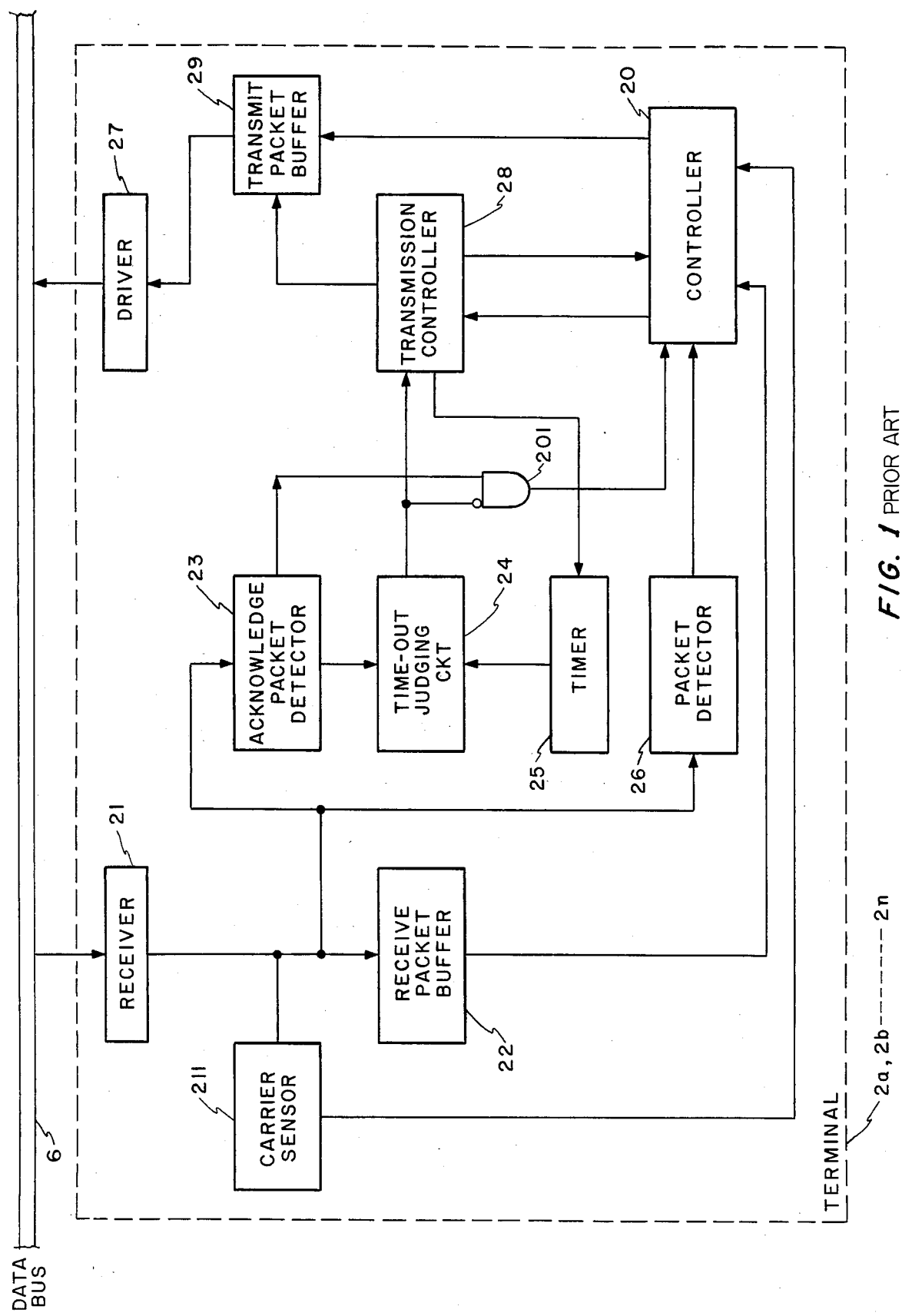
FIG. 1 is a block diagram showing an exemplary system which is implemented with terminals of the CSMA/ACK system.
Figure 2:
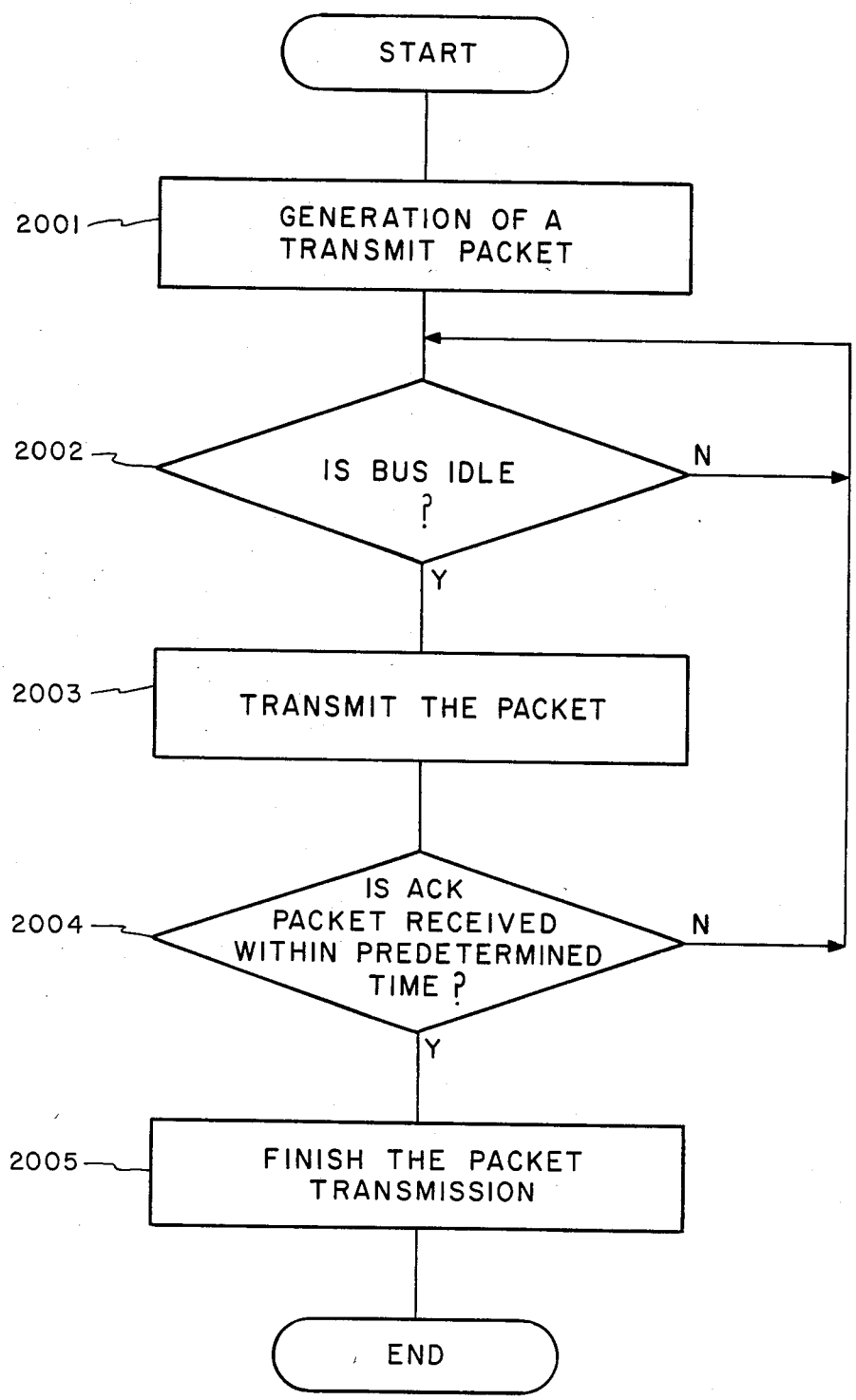
FIG. 2 is a flowchart demonstrating the operation of the terminals as shown in FIG. 1.

Each terminal 2 comprises the terminal of the conventional CSMA/ACK system which has been described with reference to FIGS. 1 and 2. Specifically, each terminal 2 has a receive path which is connected to the data bus 6 so as to constantly monitor transmit data (packets) on the data bus 6, thereby picking up a packet having a predetermined receive address. If a packet is present when the terminal 2 has detected that transmit data is absent on the bus 6, the terminal 2 transmits that packet over the transmit path. When the data transmission controller 90 has received a transmit packet over the transmit path of the terminal 2, it temporarily stores the transmit packet while requesting the arbiter 5 to give it permission to send or a data transmission right" (DTR) to the bus 6, i.e., the right to use the channel. WHen a terminal has gained DTR, the data transmission controller 90 sequentially delivers the temporarily stored transmit packet to the data bus 6 on a first-in-first-out basis.

Accommodating all of the transmission controllers 90 which are connected to the single data bus 6, the arbiter circuit 5 gives DTR via the bus 52 to any of the controllers 90 which has made a request for DTR, only but if the other controllers 90 are not then transmitting data. When two or more of the controllers 90 make a request for DTR, the arbiter 5 grants DTR to only one of them according to a predetermined priority order. The arbiter 5 is provided with a means for identifying a condition wherein the transmission controller 90 is not transmitting data, i.e., a condition wherein the data transmission controller 90 which requested and won DTR has terminated the data transmission to the data bus 6.

Figure 4:
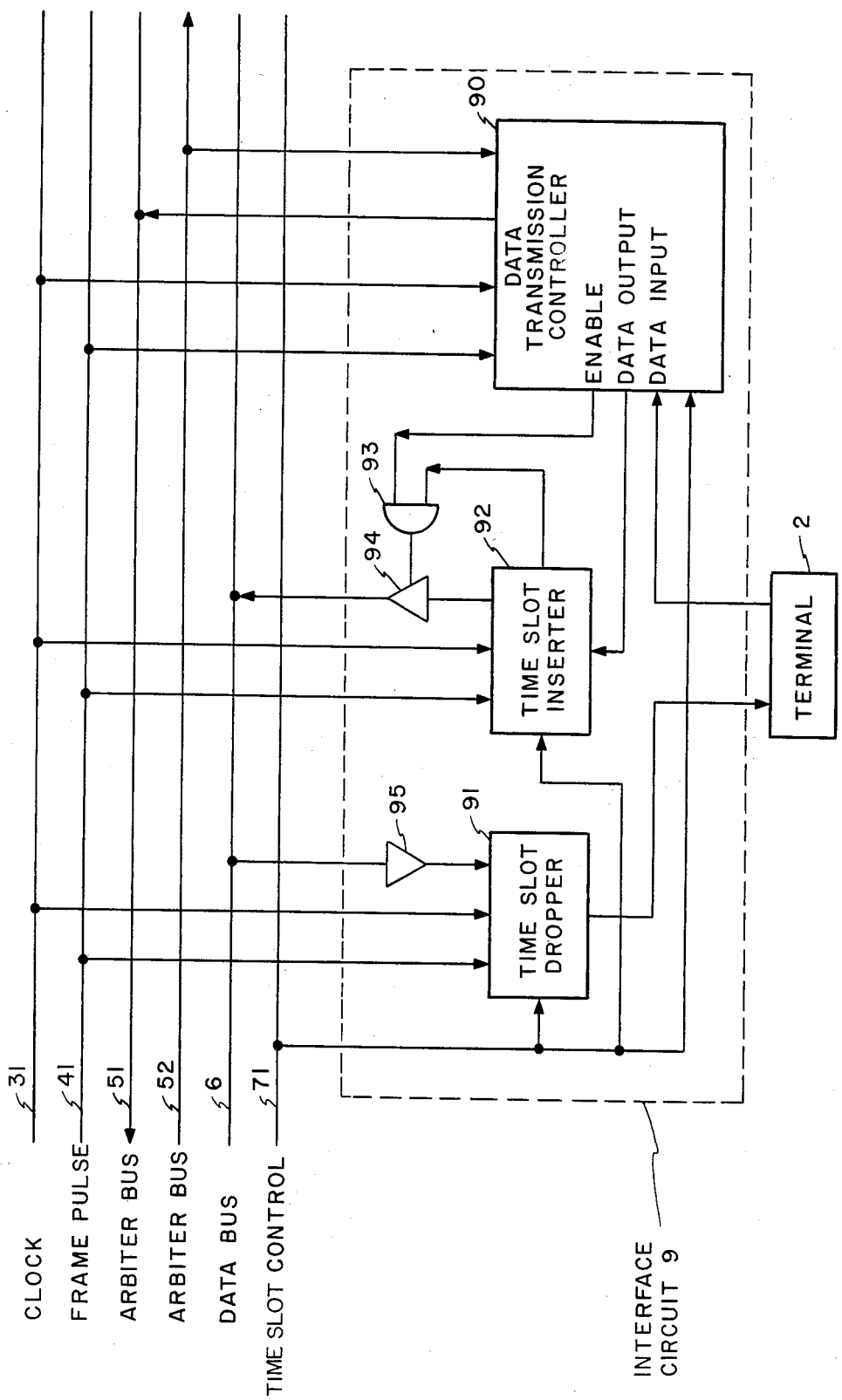
FIG. 4 is a block diagram showing an interface part of FIG. 3 in detail.

Referring to FIG. 4, each interface circuit 9 comprises a time slot dropper 91, a time slot inserter 92, an AND gate 93, a driver 94, a receiver 95, and the data transmission controller 90.

The dropper 91 may be implemented with a time switch which counts time slots in response to the clock pulses 31 and frame pulses 41. The dropper extracts data, or packet, via the receiver 95 from a particular time slot which is assigned to the terminal 2. Dropper 91 constantly delivers the extracted data to the terminal 2.

The inserter 92 is implemented with a time switch which counts time slots in response to the clock pulses 31 and frame pulses 41. The inserter sends transmit data, or packet, to a particular time slot which is assigned to the terminal 2 on the data bus 6. Upon an identification of the assigned time slot, the inserter 92 applies its output to the AND gate 93. If the DTR is granted, the controller 90 feeds an ENABLE signal to the AND gate 93 so that the transmit data is delivered to the data bus 6.

Upon receipt of transmit data from the terminal 2, the controller 90 temporarily stores it and gives a DTR request to the arbiter circuit 5 over the bus 51. An answer to the DTR request is received over the bus 52, from the arbiter 5. The request for DTR and the receipt of an answer are effected over, respectively, the buses 51 and 52 by recognizing time slots based on the clock pulses 31 and the frame pulses 41. The controller 90 recognizes its own terminal through a particular one of the time slots which is assigned to it.

The information for recognizing the time slots which are assigned to the individual terminals on the buses 6, 51 and 52 is supplied beforehand from the time slot controller 7 (FIG. 3) to the time slot dropper 91 and inserter 92 and to data transmission controller 90, the time slot assignment being made via the bus 71.

FIG. 5 shows a frame format on the data bus 6. In this particular embodiment, a plurality of terminals are divided into four user groups, each group being capable of accommodating eight terminals at a maximum.

As shown in line (C) of FIG. 5, each of the time slot dropper 91 and inserter 92 prepares clock pulses for data transmission by dividing the frequency of the clock pulses 31 by eight. As shown in line (D) of FIG. 5, the terminals which belong to the same user group transmit and receive data through the same time slot.

FIG. 6 shows a frame format on the arbiter buses 51 and 52. Since the arbiter circuit 5 has to discriminate a terminal which is requesting DTR from the other terminals, eight time slots are assigned to each user group, as shown in line (C) of FIG. 6. That is, one time slot is assigned to each terminal so that the request for DTR and the grant of the DTR may be effected through the time slot. The slot number is coincident with the terminal number.

Figure 7:
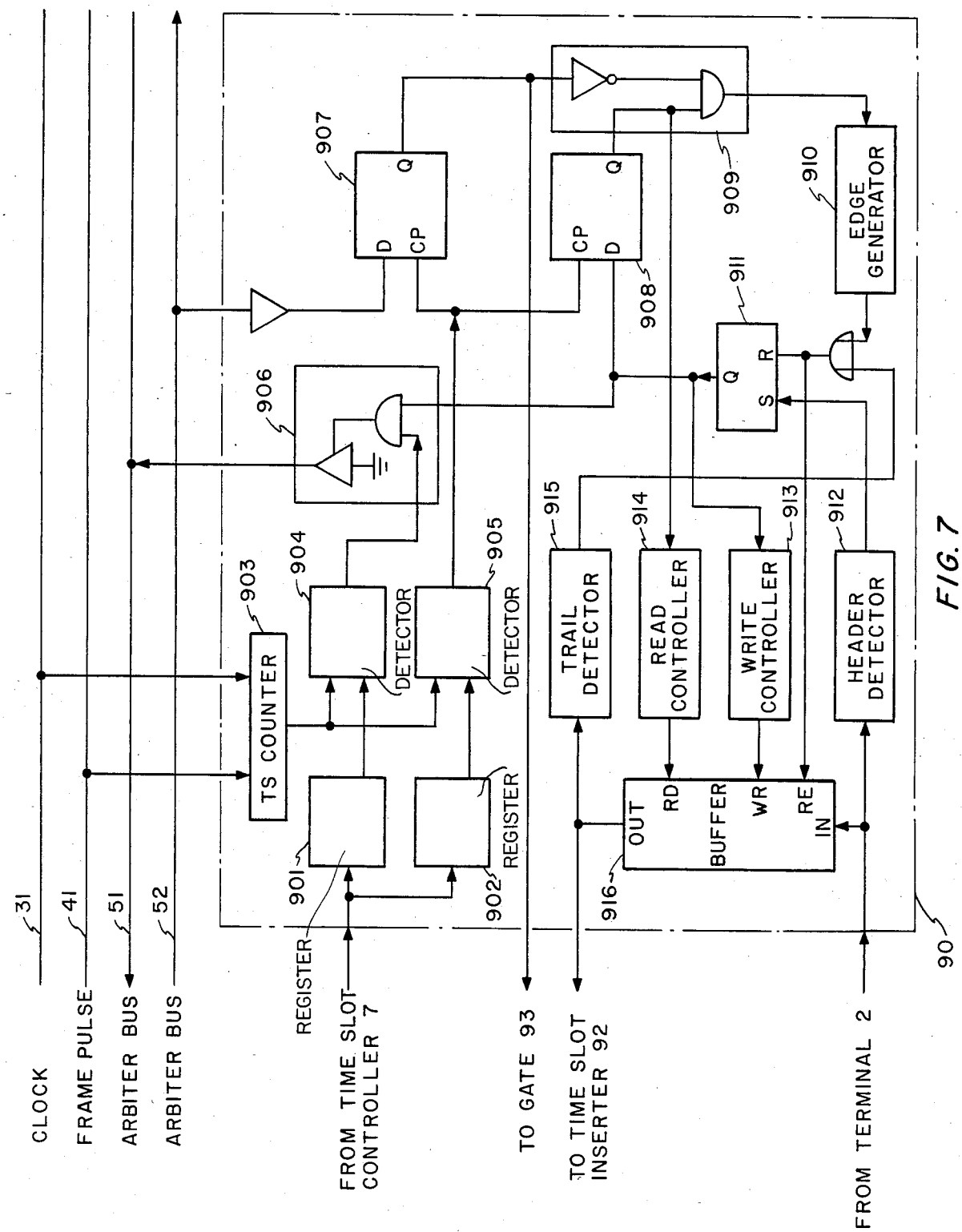
FIG. 7 is a block diagram showing a data transmission controller part of FIG. 4 in detail.

Referring to FIG. 7, the data transmission controller 90 is made up of a request time slot number register 901, an answer time slot number register 902, a time slot number counter 903, a request time slot detector 904, an answer time slot detector 905, a DTR request circuit 906, a DTR answer receive flip-flop (F·F) 907, a DTR answer valid F·F 908, a DTR answer analyzer 909, an edge generator 910, a DTR request F·F 911, a header detector 912, a write controller 913, a read controller 914, a trailer detector 915, and a buffer memory 916.

The header detector 912 produces an output when it detects the leading flag, or header, of a packet which is fed from the terminal 2.

The request F·F 911 is set by the output of the header detector 912. While the logical output level of the F·F 911 is "H", the controller 90 requests the arbiter circuit 5 to grant the DTR. The F·F 911 is reset either when the DTR request is rejected by the arbiter circuit 5 or when the trailer (or end flag) of a packet is detected.

The request time slot number register 901 comprises a register which is loaded with information identifying the one of the time slots on the time-division arbiter bus 51 (transmit side) in which a DTR request should be sent, by the time slot controller 7.

The register 902 comprises a register which is loaded with information which identifies the time slot of the time-division arbiter bus 52 (receive side) in which a DTR answer (transmission allowed/rejected signal) should be picked up, by the controller 7.

The counter 903 counts time slot numbers on the basis of the clock pulses 31 and frame pulses 41, both of which are applied to all of the controllers 90a to 90n.

The detector 904 compares a value in the counter 903 and a valve in the register 901. When a time slot for requesting a DTR request arrives, detector 904 outputs a timing pulse.

The detector 905 compares a value in the counter 903 and a valve stored in the register 902. When a time slot for extracting a DTR answer arrives, detector 905 outputs a timing pulse.

The DTR request circuit 906 delivers a logical "L" (DTR request) to the arbiter bus 51 when the detector 904 generates a timing pulse while the F·F 911 is set.

The receive F·F 907 picks up an answer from the arbiter bus 52 when the detector 905 generates a timing pulse CP. That is, if a signal "H" (data transmission allowed) is present in the bus 52 when the pulse CP appears, the F·F 907 turns its output from Q to "H". This answer is held until the detector 905 produces the next timing pulse CP.

The valid F·F 908 turns its output from Q to "H" when the detector 905 generates a timing pulse CP while the F·F 911 is set (output being "H"), showing that the answer represented by the output of the F·F 907 is valid. This output Q of the F·F 908 is held until the detector 905 produces the next timing pulse CP.

The answer analizer 909 produces "H" when the output of the F·F 908 is "H" (valid) and the output of the F·F 907 is "L" (DTR rejected), indicating that the DTR request is rejected.

The edge generator 910 is adapted to generate a pulse of "H" when the positive-going edge of an output of the answer analyzer 909 is detected. In response to the pulse of "H", the F·F 911 is reset. This allows a DTR request to be immediately interrupted when DTR is rejected. Simultaneously, a reset signal RE is applied to the buffer memory 916 to clear the memory 916, thereby discarding the packet stored in the memory 916.

The buffer memory 916 serves as a FIFO memory for storing packet data from the instant of the arrival of a packet from the terminal 2 to the instant of the return of a DTR answer from the arbiter 5.

The white controller 913 is enabled when the output of the F·F 911 is "H", i.e., when DTR is requested upon the arrival of a packet, thereby controlling the writing of the packet in the buffer memory 916. The controller 913 stops the writing control when the output of the F·F 911 becomes "L".

The read controller 914 is enabled when the F·F 908 produces "H", i.e., when a DTR answer is received within a time slot used for the answer, whereby a packet is read out of the buffer memory 916 to be fed into the time slot inserter 92. While the output of the F·F 908 is "L", the packet is not read out.

The trailer detector 915 produces "H" when it detects the trailing flag, or end flag, of a packet in the data read out of the buffer memory 916. In response, the packet transmission is considered to be ended, so that the F·F 911 is reset.

Figure 8:
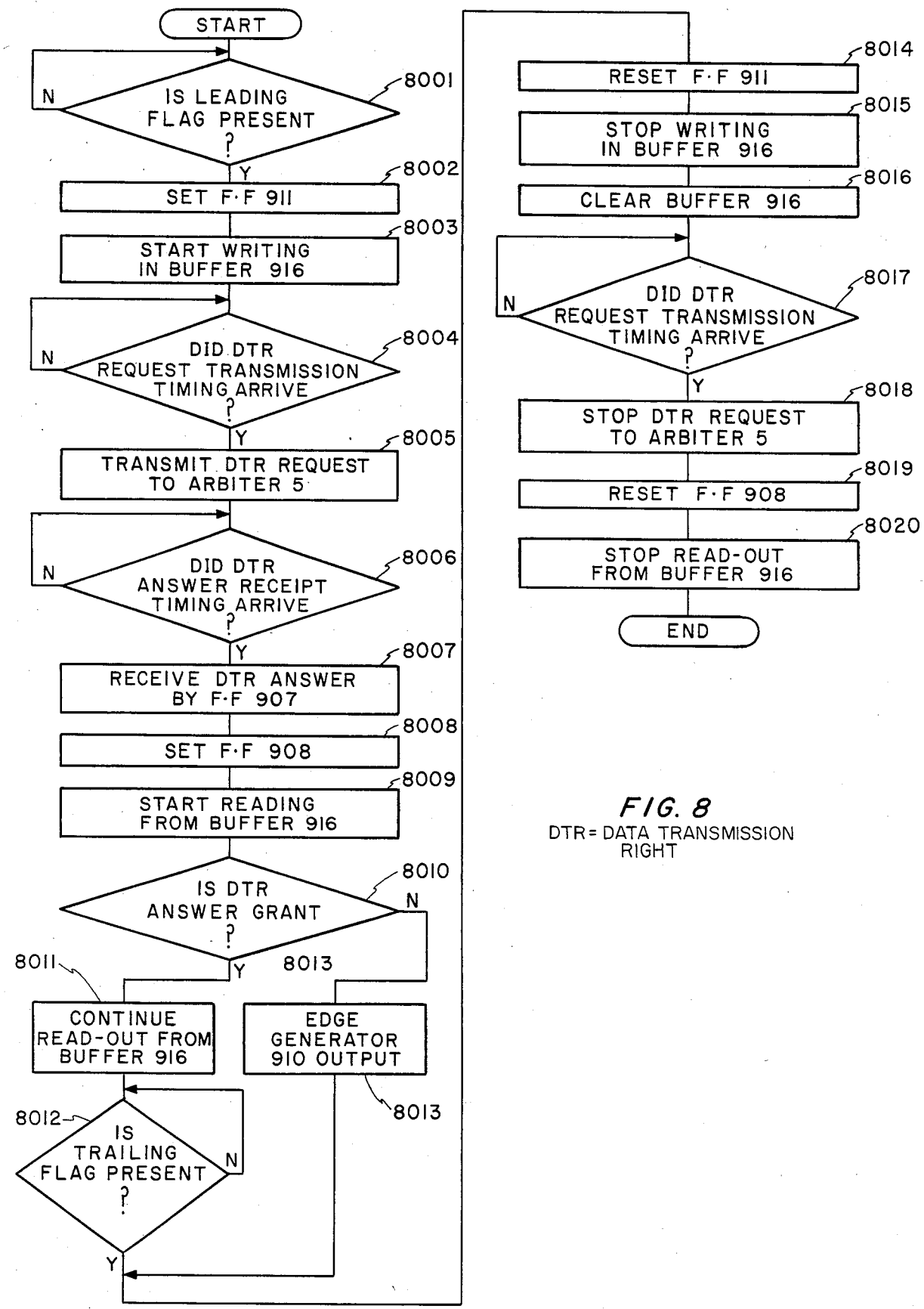
FIG. 8 is a flowchart demonstrating the operation of FIG. 7.

The operation of the controller 90 will be described with reference to FIG. 8.

When a packet from the terminal 2 arrives, the detector 912 detects its leading flag (step 8001) to set the flip-flop F·F 911 (step 8002). In response to the resulting output of the F·F 911, the controller 913 starts writing data in the buffer 916 (step 8003). As the detector 904 detects a time for making the DTR request (step 8004), the gate of a driver of the DTR request circuit 906 is opened to send a DTR request (step 8005). The logical level on the arbiter bus 51 is "L" when a DTR request is present and "H" when it is absent. When the detector 905 has produced a signal (step 8006), the F·F 907 takes in a DTR answer from the arbiter bus 52 (step 8007). The logical level on the arbiter bus 52 is "H" when DTR is granted (allowed) and "L" when is not granted (rejected). Simultaneously, the F·F 908 is set (step 8008) so that the controller 914 starts reading data out of the buffer 916 (step 8009).

On the other hand, when a DTR answer is "H" (allowed) as detected in step 8010, the F·F 907 is set to cause an ENABLE signal to be fed to the AND gate 93 (FIG. 4). Since the edge generator 910 does not output a pulse, the outputs of the F·Fs 911 and 908 are continued to, in turn, continue the read-out of data from the buffer 916 (step 8011). When all of the data which have arrived have been read out with the trailing flag of the packet detected by the detector 915 (step 8012), the F·F 911 is reset (step 8014) to interrupt its output Q, resulting in the write control by the controller 913 being terminated (step 8015).

Simultaneously, the buffer 916 is cleared (8016).

Since the F·F 911 is reset, the DTR request is not transmitted any longer (step 8018) even if the timing for DTR request is reached (step 8017). Further, F·F 908 is reset (step 8019), and the read control by the read controller 914 is terminated (step 8020).

When the DTR answer is "L" as determined by the step 8010, an AND gate in the DTR answer analyzer 909 becomes "H". This "H" is detected by the edge generator 910. In response, the generator 910 produces a pulse (step 8013) to reset the F·F 911 (step 8014).

Figure 9:
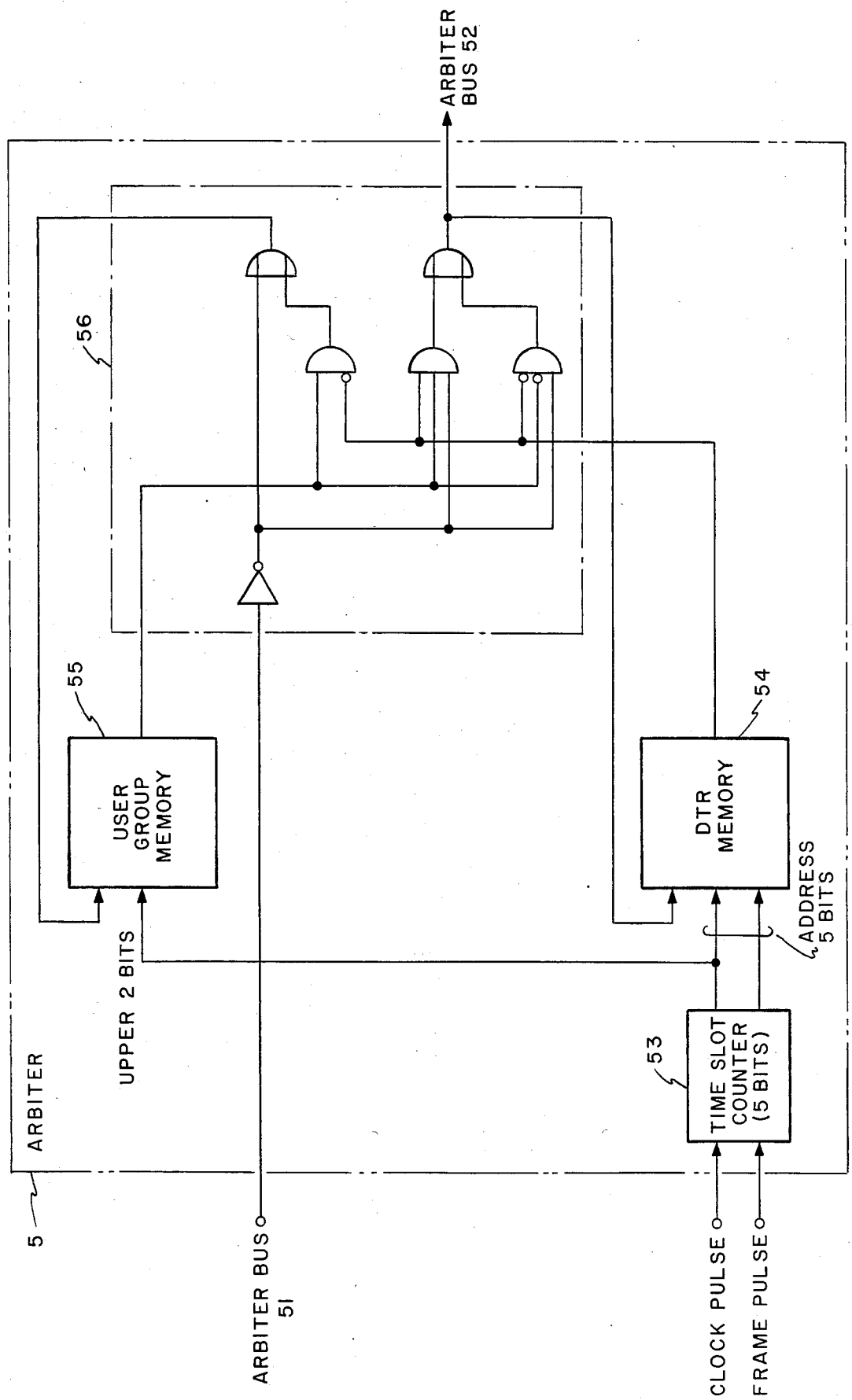
FIG. 9 is a block diagram showing a part of FIG. 3 in detail.

Referring to FIG. 9, the construction of the arbiter circuit 5 is shown in detail. The arbiter circuit 5 comprises a time slot counter 53, a user group memory 55, a data transmission right memory (DTR memory) 54, and a data transmission right decision circuit (DTR decision circuit) 56. Upon receiving the clock pulses and frame pulses, the counter 53 counts time slot numbers to generate an address (5 bits) of the memories 54 and 55. This address is fed to the memory 54. Only the upper 2 bits of the address are fed to the memory 55.

The user group memory 55 includes memory areas which are equal in number to the user groups. With such memory areas, the memory 55 memorizes whether or not DTR has been granted to any terminal on a user group basis (see (B) of FIG. 11).

Figure 11:
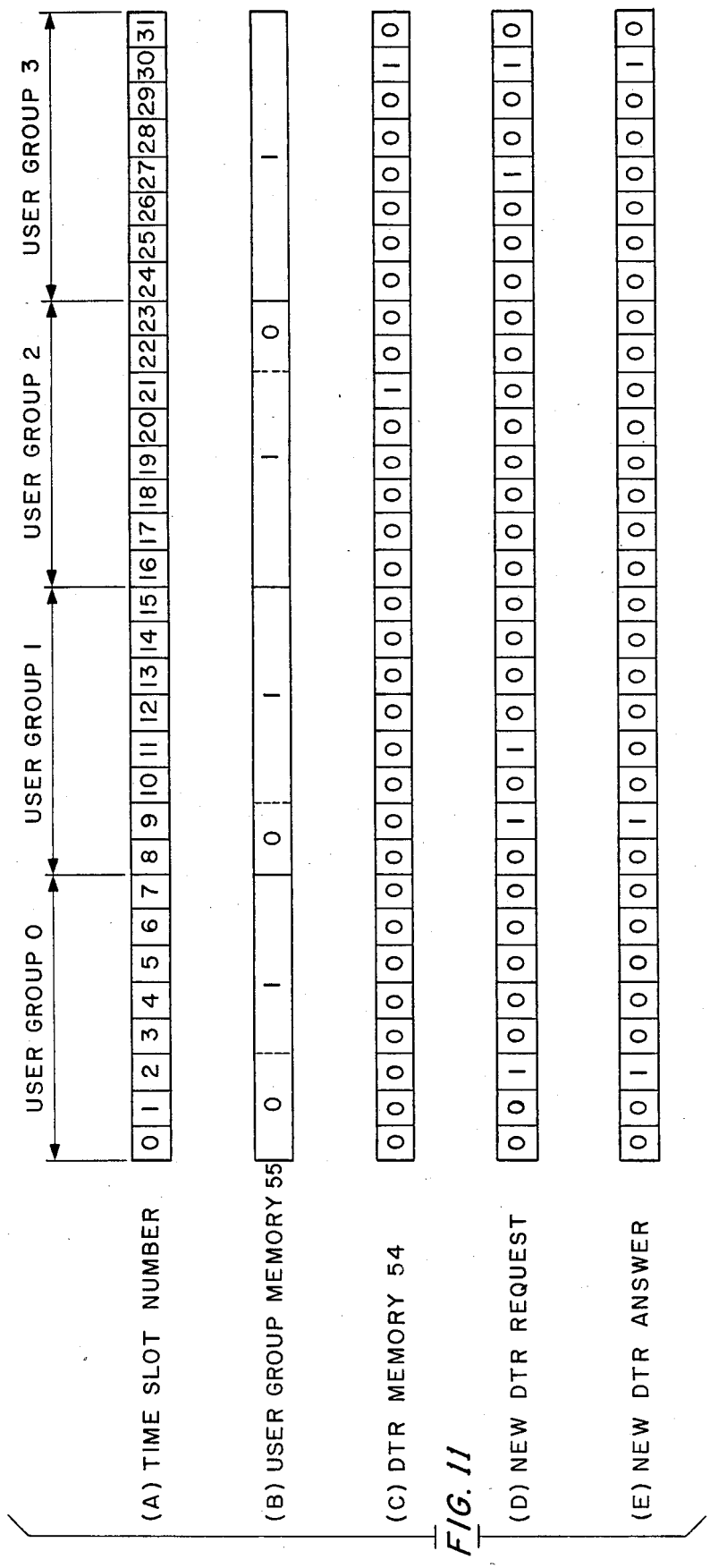
FIG. 11 is a chart showing a specific example of processing which is performed on the basis of FIG. 10.

The DTR memory 54 has memory areas the number of which is the same as the number of the terminals, and memorizes a particular terminal to which the DTR has been given on a terminal basis (see (C) of FIG. 11). In these memories 54 and 55, data "1" and data "0" are stored depending upon whether the DTR has been granted or has not been granted, respectively.

The DTR decision circuit 56 receives the DTR requests from the respective terminals and gives the DTR to one terminal, per user group, at a time. In this embodiment, the DTR is sequentially given to the terminals of the same user group according to the order of arrival of the DTR requests. When a certain terminal of a certain user group has already won DTR, all of the DTR requests in the same user group are rejected except for the continuous DTR request from that particular terminal. As soon as the terminal which has gained DTR and transmitted data completes the transmission, the DTR request disappears from the arbiter bus 51. In response, the decision circuit 56 stops the grant of DTR to that terminal and, then, accepts the DTR requests from the other terminals in the same user group according to the order of arrival.

A reference will be made to FIGS. 10 and 11 for describing the operation. In line (D) of FIG. 11, "1" is representative of the presence of a DTR request and "0" represents an absence of the request. In line (E) of FIG. 11, "1" is representative of grant of DTR and "0" represents a rejection of the DTR (no DTR).

First, in a certain time slot, whether or not a DTR request is present is detected (step 1101). If it is present, whether or not data read out of the memory 55 (step 1102) is "1" is judged (step 1103). If the data is "1" it means that the DTR has already been granted to another terminal of the same user group. Whether or not data read out of the memory 54 (step 1104) is "1" is judged to see if the terminal which is making a request for the DTR gained DTR in the processing of the same time slot during the last preceding time (step 1105). If the data read out of the memory 54 is "1", meaning that the DTR request is the continuous request from the terminal which is tranmitting data, the DTR is maintained to that terminal (step 1106). Then "H" is fed to the arbiter bus 52 (step 1107), and then data "1" which is representative of the grant of DTR is written in the memory 54.

When the data is "0", DTR has not been granted to the other terminals of the same user group as judged by the step 1103. Then, DTR is newly given to the terminal which is sending the DTR request (step 1109). Then data "1" which is representative of the grant of DTR in the user group is stored in the memory 55 (step 1110). Next, the program advances to the step 1107.

In the step 1105, if the data in the memory 54 is "0", it indicates that a terminal from which data is being transmitted, is present in the same user group. Therefore, the new DTR request is rejected (step 1111).

If no DTR request is found in the step 1101, whether or not data read out of the memory 55 (step 1112) is "1" is judged to determine whether there is a DTR grant condition in the same user group (step 1113). If it is "1", whether or not data read of the memory 54 (step 1114) is "1" is judged to determine if the terminal which is not requesting the DTR has obtained the DTR in the processing of the same time slot during the last preceding opportunity (step 1115). If the data is "1", implying that the terminal which had transmitted data has terminated the transmission, the grant of the DTR is stopped (step 1116). Then data "0" is written in the memory 55 (step 1117). Then "L" is fed to the arbiter bus 52 (step 1118), and then data "0" which is representative of an absence of the DTR is written in the memory 54 (step 1119).

If the result of judgement in the step 1113 is "NO" (i.e. if the data is "0"), it is shown that the DTR request is absent and that no terminal in the same user group is transmitting. Then, the program advances to a step 1118 without giving the DTR (step 1120). If the result of the step 1115 is "NO" (i.e. if the data is "0"), it is shown that a terminal which is transmitting exists in the same user group and, therefore, the program advances to a step 1120. Upon the end of a series of processing on one time slot, the time slot counter 53 is incremented to begin processing on the next time slot.

Figure 10:
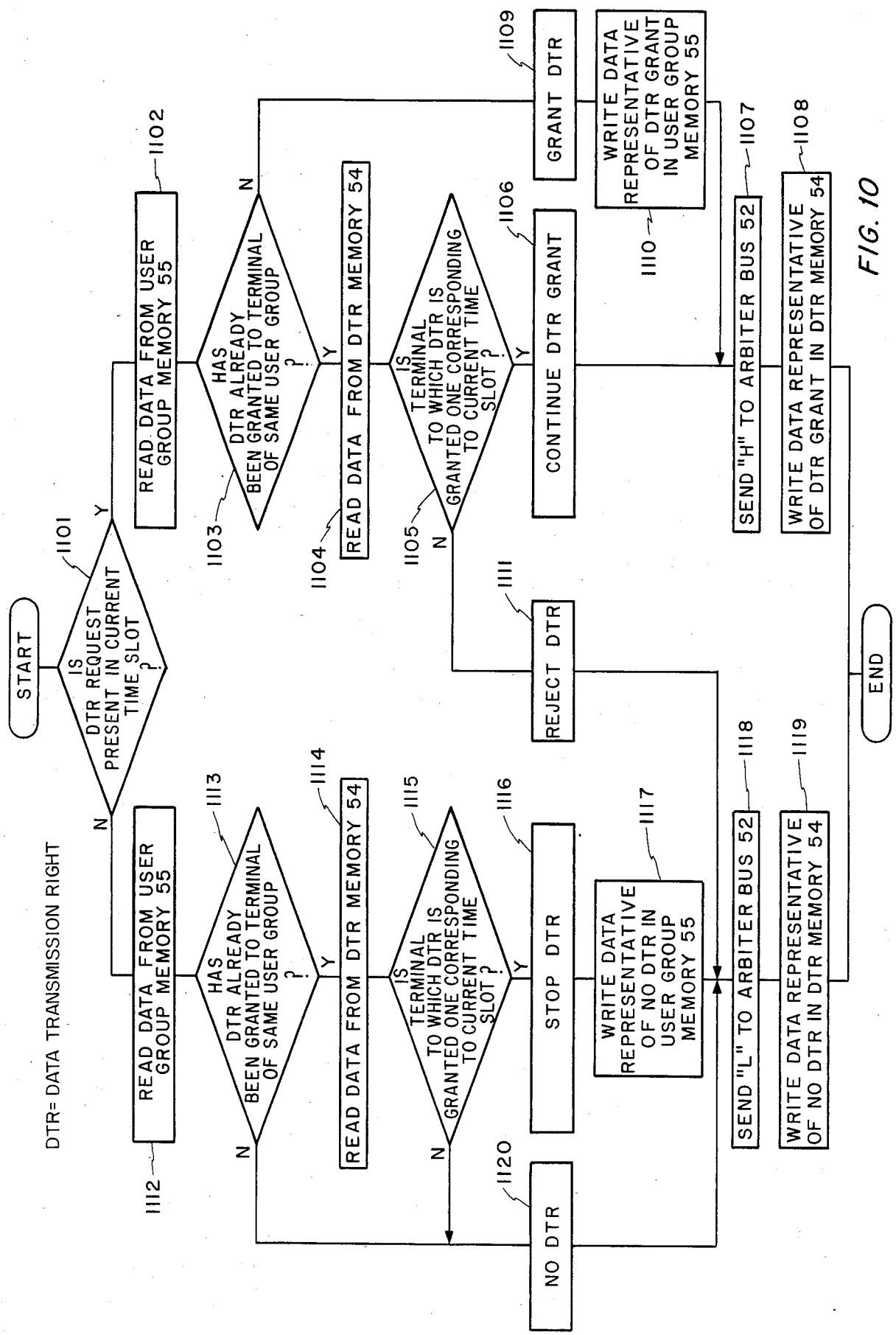
FIG. 10 is a flowchart demonstrating the operation of FIG. 9.

Specifically, comparing by the flow chart of FIG. 10 with FIG. 11, it will be seen that in a user group 0, a No. 2 terminal gains the DTR by way of the step 1101, 1102, 1103, 1109, 1110, 1107 and 1108. In the processing during time slots 3 to 7, data "1" is stored in that area of the user group memory 55 which corresponds to the user group 0, showing that a terminal which is transmitting data (No. 2 terminal in this case) exists in the same user group.

In the user group 1, two terminals (Nos. 9 and 11) have sent a DTR request at substantially the same time. In this instance, since the DTR request from the No. 9 terminal has arrived earlier than the request from the No. 11 terminal, the No. 11 request is rejected by way of the steps 1101, 1102, 1103, 1104, 1105, 1111, 1118 and 1119. Although the No. 11 terminal has already sent a packet, this packet is erased in the interface circuit 9. The No. 11 terminal, therefore, cannot receive an ACK packet. Upon the lapse of a predetermined period of time, the No. 11 terminal a transmission failure and enters into a retransmission procedure. In this manner, even if a plurality of terminals send individual packets at substantially the same time, only one of the terminals gains the DTR to complete data transmission without encountering a conflict. Further, since all of the DTR requests, adjustments (arbitration), and grants of DTR are effected within the LAN module, it is not necessary for the terminals 2a to 2n to have concern in those processes.

In the user group 2, a No. 21 terminal to which the DTR has bee granted terminates the data transmission, stops the DTR request, and is inhibited to gain DTR through the steps 1101, 1112, 1113, 1114, 1115, 1116, 1117, 1118 and 1119.

Further, in the user group 3, a No. 30 terminal which gained the DTR is continuously transmitting data and continuously provided with the DTR through the steps 1101, 1102, 1103, 1104, 1105, 1106, 1107 and 1108, a DTR request from a No. 27 terminal is being rejected.

After the processing, the DTR memory 54 is updated to store new DTR answers, as shown in line (E) of FIG. 11. Since the assignment of time slots on the arbiter bus 51 and the assignment of time slots on the arbiter bus 52 are effected independently of each other, the DTR answer receive a time slot number which may be slightly delayed relative to the DTR request transmit time slot in one controller 90. All that is required in such an alternative case is that the DTR decision circuit 56 should provide timings which agree with the respective time slots at the input and output sides of the circuit 56.

Figure 12:
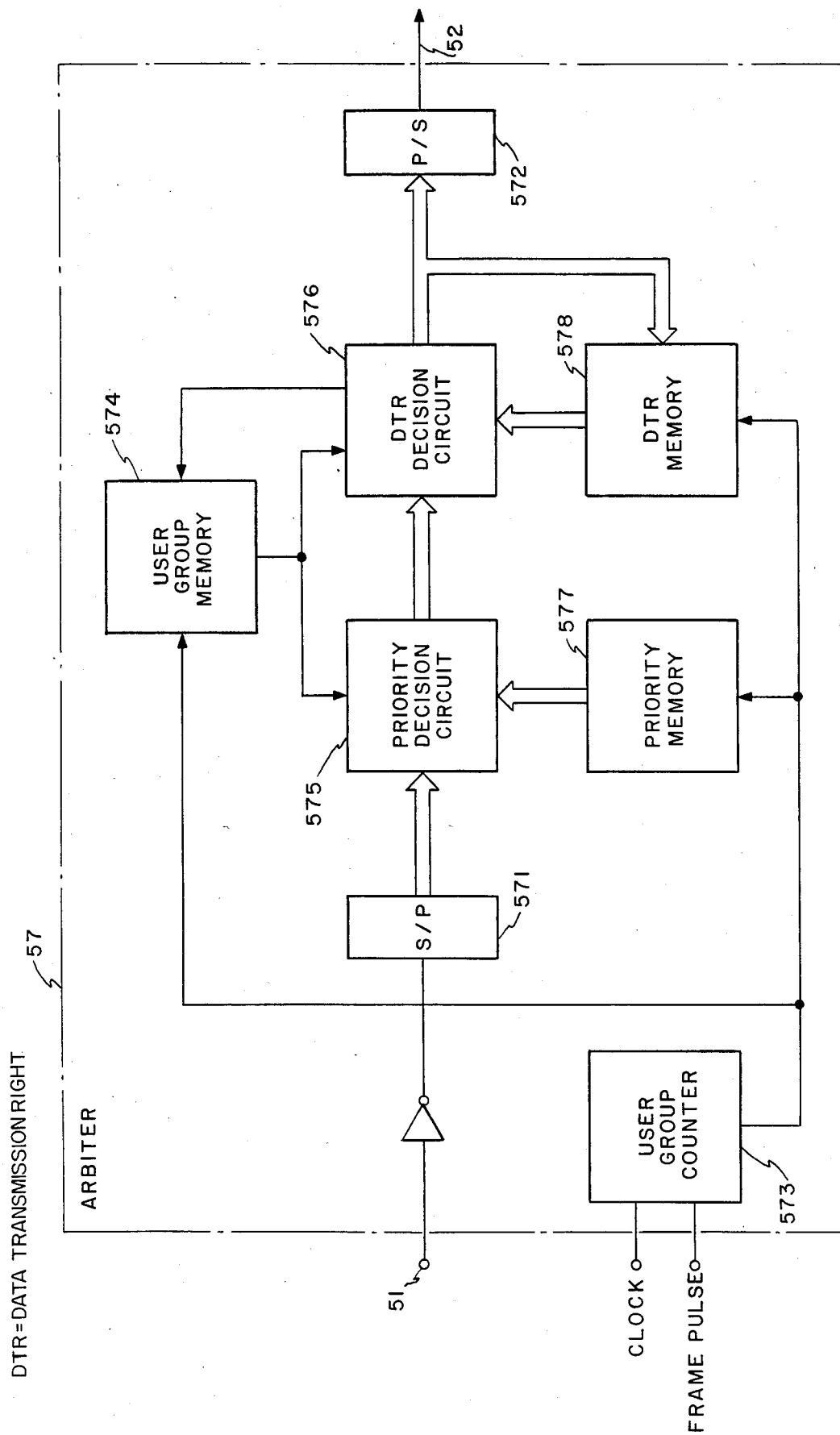
FIG. 12 is a block diagram showing a modified arbiter circuit construction of a part of FIG. 3.

Referring to FIG. 12, another construction of the arbiter circuit is shown in which different degrees of importance are attached to the terminals so as to set up a priority order in the grant of DTR. Specifically, an arbiter 57 comprises a serial-to-parallel (S/P) converter 571, a priority decision circuit 575, a data transmission right decision circuit (DTR decision circuit) 576, a parallel-to-serial (P/S) converter 572, a priority memory 577, a user group memory 574, a data transmission right memory (DTR memory) 578, and a user group counter 573.

The S/P converter 571 receives eight time slots of data which correspond to one user group and delivers them in parallel to the decision circuit 575. The priority memory 577 stores data representative of a priority order (e.g. two bits if the priority has four consecutive ranks) which is assigned to the terminals 2 (i.e., the controllers 90). In response to an output of the user group counter 573, the priority memory 577 feeds to the priority decision circuit 575 the data associated with all the terminals of that user group. When the output of the memory 574 is not "1", the decision circuit 575 receives an output of the S/P converter 571 and the output of the priority memory 577 so as to select the one of the terminals which has sent the DTR request that has the highest priority. Then decision circuit 575 produces eight-bit parallel data having "1" in only its bit position which corresponds to the selected terminal, so that the DTR may be granted to that particular terminal. Such parallel data are applied to the DTR decision circuit 576.

On the other hand, when the output of the memory 574 is "1", the output of the S/P converter 571 is fed directly to the circuit 576. The counter 573 detects and delivers a current user group number on the basis of the clock pulses and frame pulses. The user group memory 574 is the same as the memory 55 of FIG. 9. While the content of the DTR memory 578 is the same as that of the memory 54 of FIG. 9, the memory 578 receives an output of the counter 573 and delivers data to the decision circuit 576 as to the condition of the DTR grant of all the terminals of one user group, at the same time. Receiving the outputs of the circuit 575 and memories 578 and 574, the decision circuit 576 decides a particular terminal to which the DTR should eventually be granted.

Basically, the decision circuit 576 is operated in the same manner as the circuit 56 of FIG. 9. Eight such circuits 56 may be provided in parallel so as to process parallel sets of data received from eight terminals. The P/S converter 572 restores the parallel outputs of the decision circuit 576 to the original time slot order. In this construction, since the DTR is granted after the receipt of all of the DTR requests from one user group, a delay corresponding to eight time slots is unavoidable. However, such a delay does not matter because the controller 90 is capable of setting up a DTR transmit and a DTR receive time slots independently of each other, as shown in FIG. 7.

FIG. 13 shows an example of a DTR grant processing which is executed by the blocks of FIG. 12. In line (C) of FIG. 13, "3" is indicative of the highest priority. As shown, the output of the S/P converter 571 is sent through when the output of the memory 574 is "1" so as to prevent an interruption of data transmission from a terminal of a lower priority, which has gained DTR. As regards DTR requests from a plurality of terminals of equal priority, an arrangement may be made such that the circuit 575 or 576 gives DTR to one of the terminals having a lower terminal number, as compared to the other terminal numbers. Further, all the terminals in the same user group may be provided with priority ranks which are different from each other, to allow one terminal to be selected without fail.

As described above, in accordance with a data transmission control system of the present invention, data transmit paths extending from individual terminals are connected to a data bus via individual data transmission controllers. Only one of the data transmission controllers is capable of gaining a data transmission right to the data bus. In this construction, even when a plurality of terminals send packets at substantially the same time, at least one of the packets is transmitted over the data bus without being erased. This not only promotes effective use of the data bus but also enhances throughput by eliminating wasteful repetition of transmission. Especially, these effects will becomes more significant with the increase in the frequency of communication as may be held by the respective terminals.

Another advantage which is attainable with the present invention is that a highly efficient bus system can be implemented without modifying a terminal of the conventional CSMA/ACK system, i.e., simply by connecting an extra device to such a terminal.

Further, since a time-division multiplex system is applied to the data bus, different kinds of LANs can be provided by using a single LAN module.

In addition, the user groups of terminals are easily changeable because the time slot positions on both a data bus and on arbiter bus can be freely set up by the entry of time slot control information on a console.

What is claimed is:

1. A data transmission control system comprising:
a plurality of terminal means, each of said terminal means having a data transmit path connected to a data bus, said terminal means transmitting transmit data to said data transmit path after confirming that transmit data is absent on said data bus, and said terminal means retransmitting said transmit data after again confirming that transmit data is absent on the data bus in response to said terminal means failing to receive from an addressee an acknowledge information which is indicative of a receipt of the transmit data within a predetermined period of time;
a plurality of data transmission control means, each of said data transmission control means being disposed between a respective one of the data transmit paths of the terminal means and the data bus connected thereto, upon receipt of the transmit data from said terminal means said data transmission control means temporarily storing said transmit data and making a request for a data transmission right to the data bus, and transmitting the transmit data from the terminal to the data bus only when said transmission control means has gained said data transmission right;
an arbiter means responsive to a receipt of the requests for a data transmission right from the data transmission control means for granting the data transmission right to the data bus to the data transmission control means according to a predetermined priority order;
means in any of the data transmission control means which has requested the data transmission right but failed to gain the data transmission right for erasing the temporarily stored transmit data.

2. A data transmission control system as claimed in claim 1 wherein the arbiter means includes a means for granting the data transmission right in response to the data transmission right requests from the data transmission control means in order in which said data transmission right requests arrive, and for not granting the data transmission right to the other data transmission control means until said means detects that the data transmission control means which has gained the data transmission right has completed data transmission.

3. A data transmission control system as claimed in claim 1 wherein the arbiter means includes a memory means for storing a priority order as to data transmission from the terminals, and means responsive to the data transmission right requests which have occurred substantially simultaneously for referencing the memory means to grant the data transmission right to the data transmission control means associated with the terminal having high priority, and for not granting the data transmission right to the other data transmission control means until said means detects that said data transmission control means which has gained the data transmission right has completed data transmission.

4. A data transmission control system comprising:
a plurality of terminal means, each of said terminal means having a data transmit path connected to a data bus, said terminal means transmitting transmit data to said data transmit path after confirming that transmit data is absent on said data bus, and said terminal means retransmitting said transmit data after again confirming that transmit data is absent on the data bus in response to said terminal means failing to receive from an addressee an acknowledge information which is indicative of a receipt of the transmit data within a predetermined period of time;
said data bus comprising a time-division multiplex bus, said system further including a plurality of time switch means for extracting the transmit data from a time-division channel assigned to the terminal on said time division multiplex bus in order to deliver said transmit data to said terminal, and for inserting in said time-division channel on the data bus the transmit data received from the data transmission control means which has gained the data transmission right;
a plurality of data transmission control means, each of said data transmission control means being disposed between a respective one of the data transmit paths of the terminal means and the data bus connected thereto, upon receipt of the transmit data from said terminal means said data transmission control means temporarily storing said transmit data and making a request for a data transmission right to the data bus, and transmitting the tranmit data from the terminal to the data bus only when said transmission control means has gained said data transmission right;
arbiter means responsive to a receipt of the requests for a data transmission right from the data transmission control means for granting the data transmission right to the data bus to the data transmission control means according to a predetermined priority order; and means for interconnecting the arbiter means and the plurality of data transmission control means via arbiting time-division multiplex buses, each of the data transmission control means requesting and receiving data transmission right over the time-division channel assigned to each terminal on the time-division multiplex bus.

5. A data transmission control system as claimed in claim 4 wherein the data transmission control means, time division multiplex bus, arbiter means, and arbiting time-division multiplex buses are built in a single module.

6. A system for controlling the transmission of data over a data bus extending between a plurality of terminals, means associated with each of said terminals for transmitting data over said data bus during idle time slots, means associated with a terminal receiving said transmitted data for returning an acknowledging signal, means responsive to a failure of each acknowledging signal to appear for retransmitting said data over said data bus during an idle time slot, control means associated with each of said terminals for controlling said transmission over said data bus and for temporarily storing data received from said terminal pending transmission of said data over said data bus, means associated with said control means for requesting data transmission right, arbiter means responsive to said request for data transmission right for granting said transmission rights to said control means according to a predetermined priority order, and memory means associated with said arbiter means for storing said priority order.

7. The system of claim 6, and means in said arbiter means responsive to simultaneous requests for data transmission rights for granting said right to the one of said simultaneous rights which is identified from said memory means as having the highest priority among the priorities associated with said simultaneous requests.

* * * * *